United States Patent
Atmur

(10) Patent No.: US 7,151,245 B2
(45) Date of Patent: Dec. 19, 2006

(54) SYSTEMS AND METHODS FOR COMPENSATING FOR DIM TARGETS IN AN OPTICAL TRACKING SYSTEM

(75) Inventor: Robert J. Atmur, Whittier, CA (US)

(73) Assignee: The Boeing Company, Chicago, IL (US)

(*) Notice: Subject to any disclaimer, the term of this patent is extended or adjusted under 35 U.S.C. 154(b) by 540 days.

(21) Appl. No.: 10/619,050

(22) Filed: Jul. 14, 2003

(65) Prior Publication Data

US 2005/0012924 A1    Jan. 20, 2005

(51) Int. Cl.
*G01F 1/00* (2006.01)
(52) U.S. Cl. ................. 250/203.1; 250/203.6
(58) Field of Classification Search ........... 250/203.1, 250/203.6, 495.1; 356/29; 359/177, 179
See application file for complete search history.

(56) References Cited

U.S. PATENT DOCUMENTS 5,768,000 A * 6/1998 Tajima ................. 398/34
2002/0153497 A1 * 10/2002 Pepper et al. ............ 250/495.1

OTHER PUBLICATIONS

Robert C. Lewis, Jr., Christopher R. Neyman; *Characterization of the AEOS Adaptive Optics System*; Publications of the Astronomical Society of the Pacific, 114; Nov. 2002; pp. 1260-1266; The Astronomical Society of the Pacific; USA.

Paul J. Berger, Daniel V. Murphy, John R. Kenemuth, Michael L. Vigil, David Witte, Rene Abreu, David R. Dean, Charles D. Delp, Michael E. Meline, William M. Rappoport, William P. Zmek, Robert C. Allen, David A. Hansen, Sarma N. Gullapalli, Michael F. Marchionna, Louis S. Mendyk, Christopher J. Musial, Conrad Neufeld, Ralph Pringle, Andrea M. Sarnik, William J. Swanson, Mark Ealey, Thomas R. Price, David Briscoe; *AEOS Adaptive-Optics System and Visible Imager*; 19 pages; Available at <http://www.maui.afmc.af.mil/AMOS/1999_AMOSTechnicalConference/Berger_paper/B...> ; (visited Jul. 7, 2003).

* cited by examiner

*Primary Examiner*—Thanh X. Luu
*Assistant Examiner*—Tony Ko
(74) *Attorney, Agent, or Firm*—Alston & Bird LLP

(57) ABSTRACT

A system and method are provided for controlling an optical imaging system capable of providing an image of a target. The system includes a reflector, an optical amplifier and a tracking device. The reflector is capable of reflecting light representative of the image provided by the optical imaging system. In addition, the reflector is capable of being adjusted in at least one direction based upon movement of the image provided by the optical imaging system. The optical amplifier is capable of amplifying an intensity of the light reflected by the reflector with a variable gain based upon the intensity of the reflected light. And the tracking device is capable of receiving the light from the optical amplifier. As such, the reflector can be driven to a position in at least one direction based upon an image of the target represented by the light received by the tracking device.

16 Claims, 2 Drawing Sheets

SYSTEMS AND METHODS FOR COMPENSATING FOR DIM TARGETS IN AN OPTICAL TRACKING SYSTEM

FIELD OF THE INVENTION

The present invention relates generally to optical tracking systems and methods and, more particularly, relates to systems and methods for compensating for dim targets in an optical tracking system.

BACKGROUND OF THE INVENTION

Telescopes used in many industries comprise large, sophisticated computer-controlled instruments with full digital outputs. And whereas telescopes have evolved over time, designers have paid particular attention to telescope parameters, including the light-collecting power of the telescope (as a function of the diameter of the telescope) and the angular resolution (as measured by image sharpness). For a perfect telescope operated in a vacuum, resolution is directly proportional to the inverse of the telescope diameter. In this regard, the perfect telescope generally converts a plane wavefront from distant star (effectively at infinity) into a perfectly spherical wavefront, thus forming the image with an angular resolution only limited by light diffraction.

In practice, however, errors such as atmospheric and telescope errors distort the spherical wavefront, creating phase errors in the image-forming ray paths. Generally, the cause of such atmospheric distortion is random spatial and temporal wavefront perturbations induced by turbulence in various layers of the atmosphere. Image quality can also be affected by permanent manufacturing errors and by long time scale-wavefront aberrations introduced by mechanical, thermal, and optical effects in the telescope, such as defocusing, decentering, or mirror deformations generated by their supporting devices.

In light of the errors introduced into such telescope systems, mechanical improvements have been made to minimize telescope errors. As a result of requirements for many large telescopes, typically those with primary mirrors above one meter, a technique known as adaptive optics was developed for medium or large telescopes, with image quality optimized automatically by means of constant adjustments by in-built corrective optical elements. In this regard, telescope systems operating according to the adaptive optics technique generally include an adaptive optics assembly that comprises a deformable mirror that is optically coupled to the telescope behind the focus of the telescope at or near an image of the pupil. The deformable mirror, which includes a number of actuators for essentially changing the shape of the mirror, is controlled to apply wavefront correction to images received by the telescope.

In addition to the adaptive optics assembly, such telescope systems also generally include a tracking system. Whereas such conventional tracking systems are adequate in tracking objects imaged by the telescope system, such tracking systems have drawbacks. As will be appreciated, the effectiveness of the closed-loop control of the tracking system in tracking the movement of the object is generally limited by the rate at which a tracking device, such as a tracking charge-coupled device (CCD) focal plane, can record an image received from the telescope system. Because of the limit of the imaging device, some movement of the object, or residual jitter, of the object between each image taken by the focal plane array can escape the tracking system and cause degradation of images taken by the adaptive optics assembly. And as objects being tracked emit or reflect a decreasing amount of light, thus reducing the intensity of light received from the object, the ability of the tracking system to compensate for residual jitter decreases. In this regard, the time required for the tracking device to collect enough photons of light to exceed the dark-cell current of the focal plane to thereby adequately image the object increases as the object becomes dimmer. And as the time required for the tracking device to image the object increases, the ability of the tracking system to compensate for residual jitter decreases.

SUMMARY OF THE INVENTION

In light of the foregoing background, embodiments of the present invention provide an improved optical tracking system and method for controlling an optical imaging system, such as a telescope, capable of providing an image of a target. Advantageously, the optical tracking system and method of embodiments of the present invention are capable of compensating for objects being tracked that emit or reflect a decreasing amount of light such that the system operates with a substantially constant amount of residual jitter. More particularly, embodiments of the present invention are capable of controlling the intensity of light received by a tracking device such that the tracking device receives light of sufficient intensity to effectively image the target. And by controlling the intensity of light received by the tracking device, the integration time of the tracking device can be controlled such that the tracking device can collect photons of light from the target at a rate sufficient to compensate for at least a portion of the residual jitter.

According to one aspect of the present invention, a system is provided for controlling an optical imaging system capable of providing an image of a target. The system includes a reflector, an optical amplifier and a tracking device. The reflector is capable of reflecting light representative of the image provided by the optical imaging system. In addition, the reflector is capable of being adjusted in at least one direction based upon movement of the image provided by the optical imaging system. The optical amplifier is capable of amplifying an intensity of the light reflected by the reflector with a variable gain based upon the intensity of the reflected light. And the tracking device is capable of receiving the light from the optical amplifier. As such, the reflector can be driven to a position in at least one direction based upon an image of the target represented by the light received by the tracking device.

The system can also include a tracker controller capable of controlling the gain of the optical amplifier based upon at least one measurement of the intensity of the light received by the tracking device. Advantageously, the reflector can be capable of repeatedly reflecting the light and repeatedly being adjusted. In such instances, the variable-gain optical amplifier can be capable of repeatedly amplifying an intensity of the light reflected by the reflector. In addition, the tracking device can be capable of repeatedly receiving the light from the optical amplifier. Further, in such instances, the tracker controller can be capable of repeatedly controlling the gain of the optical amplifier and repeatedly driving the reflector.

The tracker controller can be capable of driving the reflector to the position in one or more directions. More particularly, the tracker controller can be capable of controlling the gain of the optical amplifier based upon a threshold intensity, in addition to the measurements of the intensity of light received by the tracking device.

In this regard, the tracker controller can be capable of comparing the measurements with the threshold intensity, and thereafter controlling the gain of the optical amplifier based upon the comparison. For example, the tracker controller can be capable of increasing the gain of the optical amplifier when the measurements are lower than the threshold intensity. As such, the intensity of the light received by the tracking device can be amplified such that the intensity of light is at least as high as the threshold intensity.

An improved method of controlling an optical imaging system capable of providing an image of a target is also provided.

BRIEF DESCRIPTION OF THE DRAWINGS

Figure 1:
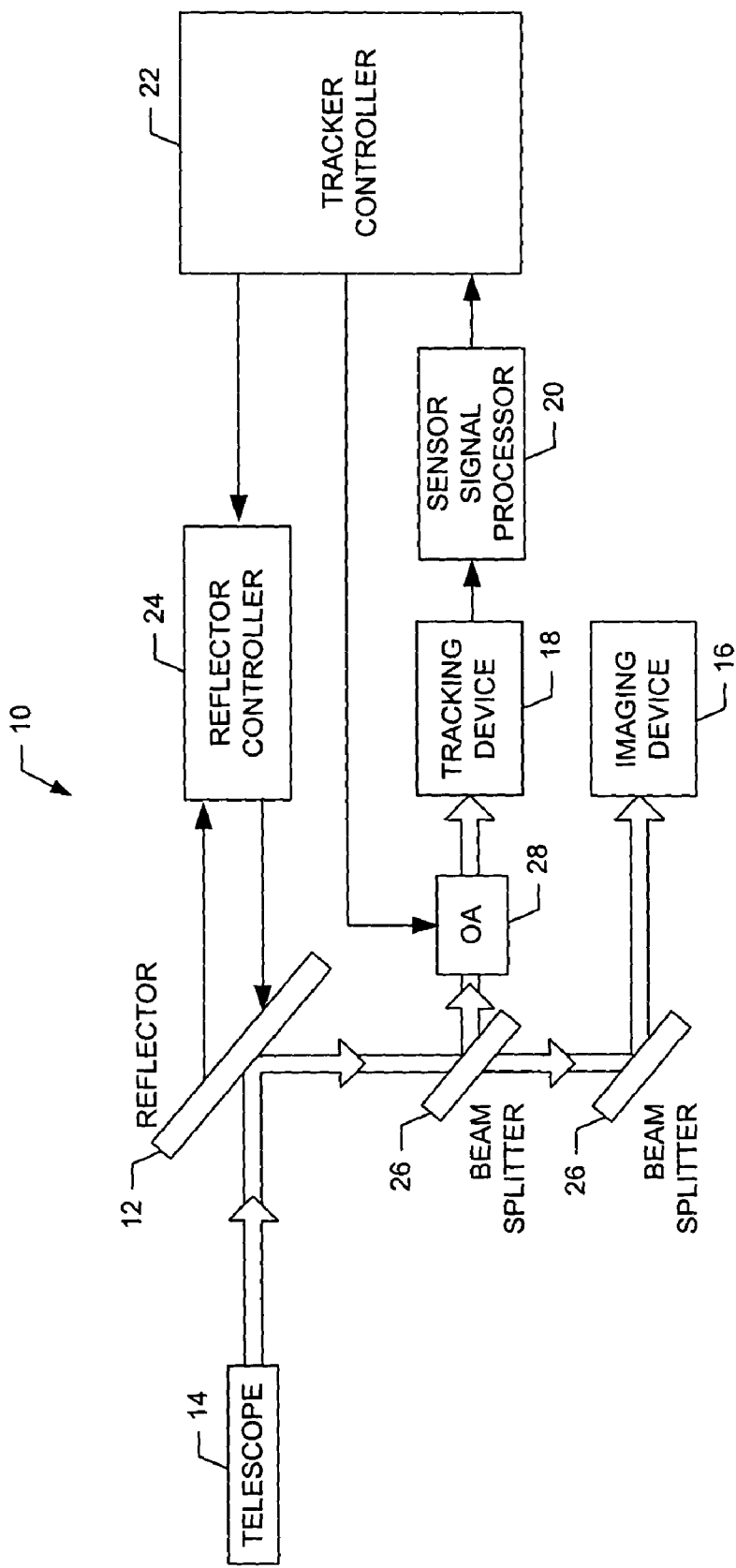
Figure 2:
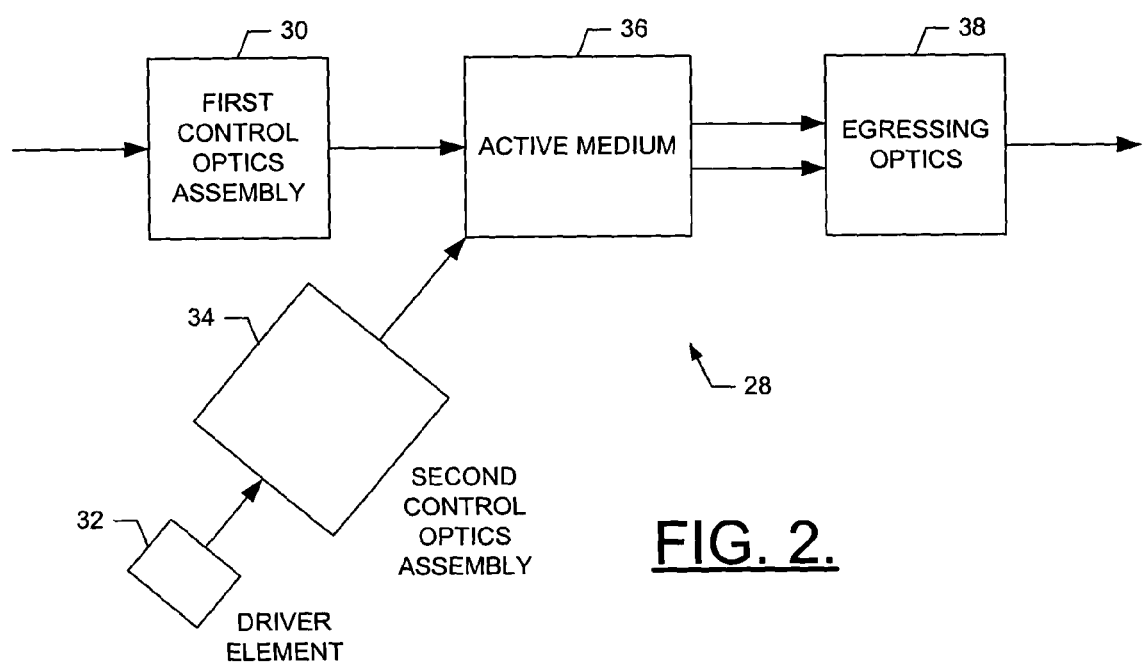

Having thus described the invention in general terms, reference will now be made to the accompanying drawings, which are not necessarily drawn to scale, and wherein:

FIG. 1 is a schematic block diagram of a tracking system for an optical imaging system, such as an adaptive optics telescope system, according to one embodiment of the present invention; and FIG. 2 is a schematic block diagram of an optical amplifier system capable of amplifying the intensity of light received by a tracking device in a tracking system, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Reference is now drawn to FIG. 1, which illustrates a block diagram of a tracking system 10 for an optical assembly, such as an adaptive optics assembly, as such are known. As shown, the tracking system includes a reflector 12, such as a fast steering mirror, that is capable of repeatedly reflecting light representative of images of a target, such as a star, received by a telescope 14, which typically includes the adaptive optics assembly comprising, among other elements, primary, secondary and tertiary mirrors. In this regard, the reflector reflects the light representative of the images while applying phase tilt adjustments to the images. In turn, the light reflected by the reflector is recorded by an imaging device 16, such as a focal plane array or charge-coupled device (CCD) focal plane, following an analog-to-digital conversion process.

The light representative of the image of a target, which is reflected by the reflector 12, can also be recorded by a tracking device 18, such as another focal plane array or charge-coupled device (CCD) focal plane. Thereafter, the light from the tracking device can be processed by a sensor signal processor 20, which repeatedly determines the center location of the image on a reference plane. The image center location is then fed into a tracker controller 22. And from the image center location, the tracker controller can repeatedly determine a position of the reflector relative to both an X axis and Y axis, such as according to known integral control. The tracker controller, in turn, can pass reflector position drive signals for both the X axis and the Y axis to a reflector controller 24, which drives the reflector to the determined position.

As will be appreciated, the reflector 12, telescope 14, imaging device 16, tracking device 18, sensor signal processor 20, tracker controller 22 and reflector controller 24 can be made from conventional elements and collectively comprise any of a number of known optical tracking systems. For example, the reflector, telescope, imaging device, tracking device, sensor signal processor, tracker controller and reflector controller can comprise elements of the Advanced Electro-Optical System (AEOS) telescope system, as such is well known to those skilled in the art. As will also be appreciated, the system 10 can include one or more optical elements such as mirrors, prisms, beam splitters 26 or the like for controlling the light received from the reflector and/or the telescope.

As stated in the background, conventional tracking systems are limited in effectiveness by the rate at which the tracking device can update the image received from the fast steering mirror. Because of the limit of the imaging device, some movement of the object, or residual jitter, of the object between each image taken by the focal plane array can escape the tracking system and cause degradation of images taken by the adaptive optics assembly. In this regard, the effectiveness of conventional tracking systems to compensate for residual jitter is limited by the time required for the imaging device to collect enough photons of light to exceed the dark-cell current of the focal plane of the tracking device, which is directly proportional to the intensity of light received by the telescope from the target.

Advantageous embodiments of the present invention are therefore capable of controlling the intensity of light received by the tracking device 18 such that the tracking device receives light of sufficient intensity to effectively image the target. More particularly, embodiments of the present invention provide a variable-gain optical amplifier (OA) 28, such as a variable-gain optical parametric amplifier, at the input of the tracking device. The gain of the optical amplifier can be controlled by the tracker controller 22 or other processor based upon the intensity of light (i.e., photon rate) received by the tracking device. In this manner, the tracker controller can amplify the light received by the tracking device with a controlled gain when the intensity of light received by the tracking device is below a threshold intensity such that the tracking device receives light with an intensity at least as high as the threshold intensity. By controlling the intensity of light received by the tracking device, the tracker controller can control the integration time of the tracking device such that the tracking device can collect photons of light from the target at a rate sufficient to compensate for at least a portion of the residual jitter.

The OA 28 can comprise any of a number of optical amplifiers, as such are well known to those skilled in the art. As shown in FIG. 2, according to one advantageous embodiment, however, the OA can comprise an optical amplifier system including a first control optics assembly 30, a driver element 32, a second control optics assembly 34, an active medium 36 and egressing optics 38. The first control optics assembly can receive the light from the telescope 14, and thereafter adjust the incoming laser beam in accordance with a first desired wavelength, polarization and beam propagation parameters (e.g., precise wavelength filtering to the expected signal wavelength, the optical bandwidth of the incoming light, the polarization of the light, etc.). The driver element can produce a driver beam of light, which the second control optics assembly can receive and then adjust in accordance with a second desired wavelength, polarization and beam propagation parameters.

The active medium of the OA 28 can comprise any of a number of different mediums including, for example, a Brillouin active medium, Rayleigh active medium, a Raman scattering active medium, or a spin-flip Raman active medium. In this regard, the active medium is capable of providing a non-linear optical interaction between the outputs of the first and second control optics assemblies 30, 34 such that the light from the telescope 14 is amplified producing an amplified output beam of light and a depleted driver beam of light. The egressing optics can then receive the amplified output beam of light and the depleted driver beam of light. Then, the egressing optics can transmit the amplified output beam of light to the tracking device 18 in accordance with a third desired wavelength, polarization and beam propagation parameters. Additionally, the egressing optics can prevent transmission of the depleted driver beam of light. For more information on such optical amplifiers, see U.S. patent application Ser. No. 10/342,679, entitled: Stimulated Brillouin Scattering Optical Amplifier, filed Jan. 15, 2003; U.S. patent application Ser. No. 10/361,060, entitled: Stimulated Rayleigh Scattering Optical Amplifier, filed Feb. 8, 2003; and U.S. patent application Ser. No. 10/382,596, entitled: Stimulated Spin-Flip Raman Optical Amplifier, filed Mar. 6, 2003, the contents of all of which are hereby incorporated by reference in their entirety.

In operation, the tracking system 10 is capable of tracking a target, such as in accordance with any technique known to those skilled in the art. As the system tracks the target, however, the tracker controller 22 is capable of repeatedly receiving measurements of the intensity of light received by the tracking device 18 as the tracking device receives light representative of an image of the target. The tracker controller can receive the measurements from any of a number of different sources capable of measuring the intensity of light received by the tracking device, such as from any of a number of different sensors (not shown) located proximate the input, or at the input, of the tracking device.

As the tracker controller 22 receives measurements of the intensity of light representative of images of the target, the tracker controller can compare the intensity of light to a threshold intensity. In this regard, the tracker controller can compare a measurement of the intensity of light representative of each image of the target to a threshold intensity. Alternatively, the tracker controller can repeatedly average the measurements over a number of images of the target, and thereafter compare the averages to the threshold intensity. Respective of whether the tracker controller compares each measurement or an average of measurements, if the intensity of light is above the threshold intensity, the tracker controller can control the gain of the OA 28 such that the tracking device 18 receives amplified light from the reflector 12, where the light can be amplified with a null gain, or alternatively, a predefined, default gain.

If the intensity of light is below the threshold intensity or falls below the threshold intensity, however, the tracker controller 22 can increase the gain of the OA 28 to amplify the light received by the tracking device 18 such that the intensity of the amplified light received by the tracking device is at least as high as, and typically substantially equal to, the threshold intensity. The tracker controller or other processor can control the gain in any of a number of different manners. For example, with optical amplifiers such as that shown in FIG. 2, the tracker controller can control the gain of the optical amplifier by controlling the intensity of the driver beam of light produced by the driver element 32.

By controlling the gain of the OA 28, the tracker controller can control the intensity of light received by the tracking device. And by controlling the intensity of light received by the tracking device, the tracking device can receive amplified light with a substantially constant intensity. The tracking device can thereafter record an image represented by the amplified light which, as will be appreciated, typically comprises the image represented by the reflected light with increased intensity. Advantageously, by amplifying the light from the reflector 12, the OA is capable of outputting light with a substantially constant intensity such that the tracking device can collect the photons of light at a substantially constant rate. As such, the tracking system 10 is capable of operating with reduced residual jitter, particularly when the target emits or reflects a decreased amount of light.

In conventional tracking systems, for example, when the target emits or reflects a decreased amount of light, performance of the tracking system can decrease at approximately a visual magnitude from seven to eight. According to embodiments of the present invention, by amplifying the light from the reflector, the tracking system can be capable of operating with an increased performance on the order of approximately twenty optical magnitudes over the performance of conventional tracking systems. Due to thermal noise and photon rate limitations, however, tracking systems operating in accordance with embodiments of the present invention will typically operate with an increased performance on the order of approximately fifteen visual magnitudes over conventional tracking systems. In this regard, the tracking system of embodiments of the present invention may be capable of operating with a gain of 0–120 dB starting when the visual magnitude is approximately 7, and extending to 22, approximately 5 visual magnitudes for every 40 dB of gain. The tracking system can operate with any of a number of different maximum gains, but the maximum gain is typically set by the well depth on the CCD focal plane, when the tracking device comprises a CCD focal plane.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for controlling an optical imaging system capable of providing an image of a target, the system comprising:

a reflector configured for reflecting light representative of the image provided by the optical imaging system, wherein the reflector is configured for being adjusted in at least one direction based upon movement of the image provided by the optical imaging system;

an optical amplifier configured for amplifying an intensity of the light reflected by the reflector with a variable gain based upon the intensity of the reflected light; and a tracking device configured for receiving the light from the optical amplifier such that the reflector can be driven to a position in at least one direction based upon an image of the target represented by the light received by the tracking device.

2. A system according to claim 1 further comprising:
a tracker controller configured for controlling the gain of the optical amplifier based upon at least one measurement of the intensity of the light received by the tracking device, wherein the tracker controller is also configured for driving the reflector to the position in at least one direction.

3. A system according to claim 2, wherein the tracker controller is configured for controlling the gain of the optical amplifier further based upon a threshold intensity.

4. A system according to claim 3, wherein the tracker controller is configured for comparing the at least one measurement of the intensity of the light received by the tracking device with the threshold intensity, and thereafter controlling the gain of the optical amplifier based upon the comparison.

5. A system according to claim 4, wherein the tracker controller is configured for increasing the gain of the optical amplifier when the at least one measurement of the intensity of light is lower than the threshold intensity to thereby amplify the intensity of the light received by the tracking device such that the intensity of light is at least as high as the threshold intensity.

6. A system according to claim 2, wherein the reflector is configured for repeatedly reflecting the light and repeatedly being adjusted, wherein the variable-gain optical amplifier is configured for repeatedly amplifying an intensity of the light reflected by the reflector, wherein the tracking device is configured for repeatedly receiving the light from the optical amplifier, and wherein the tracker controller is configured for repeatedly controlling the gain of the optical amplifier and repeatedly driving the reflector.

7. A method for controlling an optical imaging system capable of providing an image of a target, the method comprising:
reflecting, via a reflector, light representative of the image provided by the optical imaging system;
optically amplifying an intensity of the light reflected by the reflector with a variable gain based upon the intensity of the reflected light; and
receiving the reflected light with amplified intensity such that the reflector can be driven to a position in at least one direction based upon an image of the target represented by the reflected light with amplified intensity.

8. A method according to claim 7 further comprising:
receiving at least one measurement of the intensity of the reflected light, and thereafter selecting the gain of the amplification based upon at least one measurement.

9. A method according to claim 8, wherein selecting the gain comprises selecting the gain further based upon a threshold intensity.

10. A method according to claim 9, wherein selecting the gain comprises: comparing the at least one measurement of the intensity of the reflected light with the threshold intensity, and thereafter selecting the gain based upon the comparison.

11. A method according to claim 10, wherein amplifying the intensity comprises amplifying the intensity with an increased gain when the at least one measurement of the intensity is lower than the threshold intensity to thereby amplify the intensity of the reflected light such that the intensity of the reflected light is at least as high as the threshold intensity.

12. A method according to claim 8, wherein reflecting the light comprises repeatedly reflecting the light, wherein amplifying an intensity of the light comprises repeatedly amplifying an intensity of the light, and wherein receiving the reflected light comprises repeatedly receiving the reflected light.

13. A method according to claim 7 further comprising:
driving the reflector to a position in at least one direction based upon an image of the target represented by the reflected light with amplified intensity.

14. A method for accounting for a low intensity of light in a tracking system for an optical imaging system capable of providing an image of a target, wherein the tracking system includes a reflector capable of reflecting light representative of the image, and wherein the method comprises:
receiving at least one measurement of the intensity of light reflected via a reflector of the optical imaging system;
comparing the at least one measurement of the intensity of the reflected light with a threshold intensity; and
selecting a gain of an optical amplifier based upon the comparison such that the optical amplifier can amplify the intensity of the reflected light with the selected gain, and thereafter the reflector of the tracking system can be driven to a position based upon an image of the target represented by the reflected light with amplified intensity.

15. A method according to claim 14, wherein selecting the gain comprises increasing the gain when the at least one measurement of the intensity is lower than the threshold intensity such that the optical amplifier can amplify the intensity of the reflected light such that the intensity of the reflected light is at least as high as the threshold intensity.

16. A method according to claim 14, wherein receiving at least one measurement comprises repeatedly receiving at least one measurement, wherein comparing the at least one measurement comprises repeatedly comparing the at least one measurement, and wherein selecting a gain comprises repeatedly selecting a gain.

* * * * *

UNITED STATES PATENT AND TRADEMARK OFFICE
CERTIFICATE OF CORRECTION

PATENT NO. : 7,151,245 B2 Page 1 of 1
APPLICATION NO. : 10/619050
DATED : December 19, 2006
INVENTOR(S) : Atmur It is certified that error appears in the above-identified patent and that said Letters Patent is hereby corrected as shown below:

Column 5,
Line 50, "Respective" should read --Irrespective--.

Signed and Sealed this

Third Day of April, 2007

JON W. DUDAS
*Director of the United States Patent and Trademark Office*